(No Model.)
J. T. HAYDEN.
GRADUATING VALVE FOR TRIPLE VALVE MECHANISMS.
No. 493,715. Patented Mar. 21, 1893.
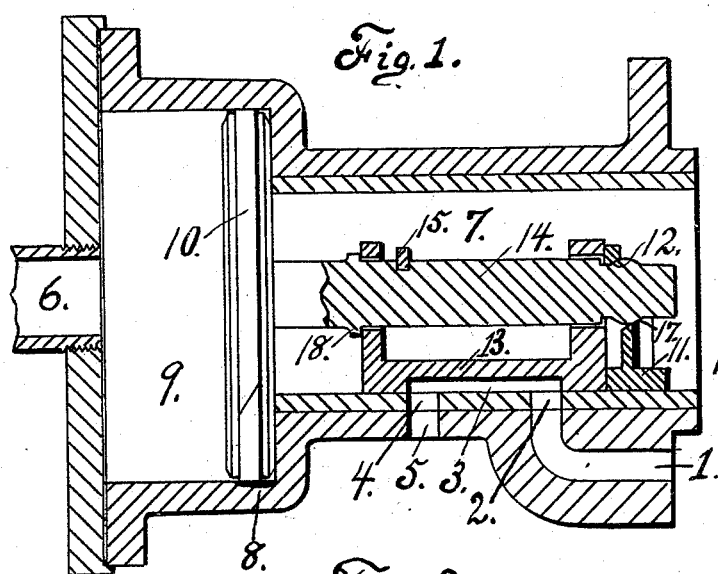
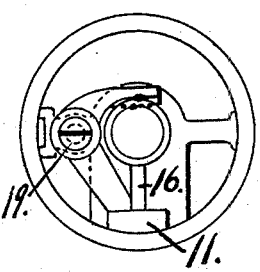
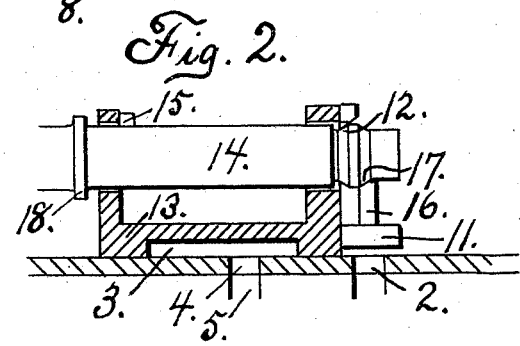
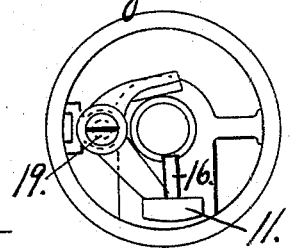
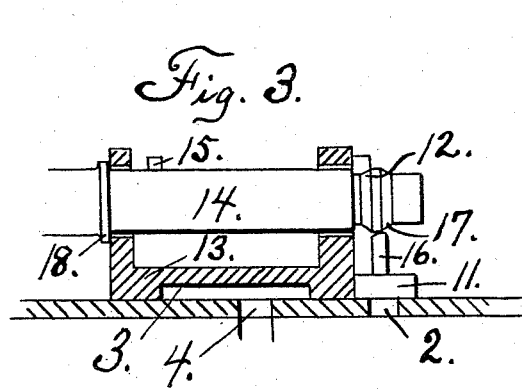
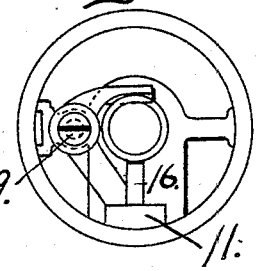
Witnesses
W. G. Glover.
S. Richardson
J. T. Hayden, Inventor
By his Attorney
Paul Synnestvedt.

UNITED STATES PATENT OFFICE.

JAMES T. HAYDEN, OF CHICAGO, ILLINOIS, ASSIGNOR TO THE CRANE COMPANY, OF SAME PLACE.

GRADUATING-VALVE FOR TRIPLE-VALVE MECHANISMS.

SPECIFICATION forming part of Letters Patent No. 493,715, dated March 21, 1893.

Application filed September 21, 1892. Serial No. 446,436. (No model.)

*To all whom it may concern:*

Be it known that I, JAMES T. HAYDEN, a citizen of the United States, residing at Chicago, in the county of Cook and State of Illinois, have invented certain new and useful Improvements in Graduating-Valves for Triple-Valve Mechanisms, of which the following is a specification.

My invention relates to devices used in automatic brake mechanisms for controlling the flow of air from the auxiliary reservoir to the brake cylinder in graduation or service stop applications of the brakes.

The object of my invention is, to provide means for controlling the flow of air from the auxiliary reservoir to the brake cylinder, which while capable of sensitive action such as is required in service applications of the brake, will also close the air passage absolutely tight when it is desired to hold the brake applied for some time, and not through leakage by the seat of the valve permit the gradual increase of the braking power in the cylinder or release of the brakes from too long continued equalization of pressure between the reservoir and cylinder. I attain these objects, first, by constructing my graduating valve with a larger seat area than is commonly used, thus giving it the benefit of a heavier pressure to hold it shut when seated, and second, by using what may be called a combination of a puppet and slide valve the action of which is such as to keep the seat free from accumulations of dirt by a kind of scraping motion tending to push the dirt away from the valve.

The improvement claimed is hereinafter more fully set forth.

In the accompanying drawings, Figure 1, is a sectional elevation of a triple valve embodying my invention, an end view of the same with the piston and valve in the same position being shown in Fig. 4. Fig. 2, is a sectional elevation of the valve in the position in which air is allowed to pass from the reservoir to the cylinder. Fig. 5, is an end view of the parts in the position shown in Fig. 2. Fig. 3, is a sectional elevation of the valve in the position in which the brakes are held applied, and the end view of the same is shown in Fig. 6.

The position represented in Fig. 1, is what is called the release position because in that position there is a communication established from the brake cylinder to the atmosphere through the ports and passages 1, 2, 3, 4, and 5, the cylinder being connected at 1, and the exhaust at 5. In this position air enters from the train pipe at the connection 6, feeds through the by-pass 8, to the chamber 7, which is in direct communication with the auxiliary reservoir, and accumulates in said reservoir until it is of the same degree of pressure as that in the train pipe.

The piston 10, working in the cylindrical chamber 9, with its stem 14, and slide valve 13, working in the chamber 7; as well as the location of the openings to the train pipe, reservoir and cylinder are substantially the same as shown in a number of previous patents granted to Westinghouse and others, and being well known to those skilled in the art, require no detailed description.

11 is a valve of an area of sufficient size to cover the port 2. It is pivoted to the slide valve 13, on the end and at one side of the opening made to receive the stem 14, and has an arm projecting over the stem and adapted to be actuated by the inclined plane 12, for raising the valve 11, from its seat. The pin 16, attached to the valve 11 on its upper side, is for the purpose of seating the valve when it is forced down by the inclined plane 17 acting upon the upper end of said pin.

19, is a screw pin made in the form of an ordinary round head machine screw and screwed into the slide valve 13, to act as a pivot for the graduating valve 11.

To apply the brakes lightly, the pressure in the train pipe is slightly reduced when the action of the valve is as follows:—The air in the chamber 9, being in communication with the train pipe, is reduced simultaneously with that in the train pipe, whereupon the pressure in the chamber 7, and the reservoir in communication therewith attempts to flow back through the by-pass 8, but on account of the small size of the same cannot find relief promptly enough and so moves the piston 10, to the left, covering the by-pass 8, and by means of the stop-pin 15, carrying the slide valve to the left far enough to close the communication between the cylinder port 2, and the exhaust 5, and bring the graduating valve 11, directly over the port 2, as clearly shown in Fig. 2. This allows the air in the valve chamber 7, to expand into the cylinder through the port 2, until the pressure on the right side of piston 10, is reduced to a point slightly below that on the left side, when the reaction of the latter pressure will move the piston to the right until the shoulder 18, strikes the additional resistance offered by the slide valve which will serve to stop it in that position as any further reduction in the chamber 7, will be prevented by the valve 11, coming down to its seat so as to cover the port 2, as shown in Fig. 3.

To better understand the movement of the valve 11, let it be considered that the brakes are already applied with a small amount of pressure, the parts being in the position shown in Fig. 3, and it is now desired to increase the braking power. Sufficient reduction is made in the train pipe and chamber 9, to cause the piston 10, and stem 14, to move to the left until the valve 13 being struck by the stop pin 15, arrests the motion, as in Fig. 2, at which time the valve 11, will have been raised from its seat by means of the inclined plane 12, this being accomplished without any movement of the slide valve because of a small amount of slack or independent motion that the slide valve 13, has on the stem 14. When the pressure in the auxiliary reservoir and chamber 7, has expanded into the cylinder until it is again lower than that in the train pipe and chamber 9, the piston will be moved to the right to the position shown in Fig. 3, in which the lower inclined plane 17, through the pin 16, will seat the valve 11, covering the port 2, to the cylinder, and the air pressure holding it tight against the seat preventing any further accumulation of pressure in the cylinder.

In the practice of my invention I prefer to make the valve 11, of the form shown and described because I find that form the cheapest to manufacture while equally efficient in action to any of several other similar constructions which may readily be arranged to accomplish the same result, it being readily attached to the end of the slide valve by the pivot pin 19, so that in the process of manufacture, the face of the valve 11 and that of the slide valve 13 may be turned in the lathe while fastened together; and not being as liable to get out of order when working on a pivot as if it were arranged to have a direct vertical reciprocating motion on a guide or stem.

To release the brakes an excess of pressure is put against the left side of the piston 10, sufficient to overcome the resistance of the pressure in the auxiliary reservoir and friction of all the parts, when the whole will assume the position shown in Fig. 1, in which the communication between the reservoir and cylinder is closed, the opening from the train pipe to the reservoir reopened and the pressure in the cylinder allowed to escape through the passages and ports 1, 2, 3, 4, and 5, as previously mentioned.

Having thus described my invention, what I claim as new, and desire to secure by Letters Patent, is—

1. In controlling mechanism for automatic air brakes, the combination of an auxiliary reservoir, a brake cylinder, a triple valve casing, a port and passage leading from said reservoir to the brake cylinder, a port and passage forming an exhaust from said cylinder, a slide valve controlling said ports in the release of the brakes, a graduating valve controlling the port from the reservoir to the brake cylinder in the application of the brakes, a piston and stem for moving said valves, said stem having an incline thereon for operating the graduating valve to open and close the port from the reservoir to the brake cylinder, substantially as described.

2. In triple valve mechanisms, the combination of an auxiliary reservoir, a brake cylinder, a triple valve casing, a piston moved one way by train pipe pressure and the other by reservoir pressure and having an incline on its stem, a slide valve for controlling the exhaust from the cylinder to the atmosphere; with a pivoted graduating valve controlling a port directly from the reservoir cavity to the cylinder passage, said graduating valve being operated to open and shut by a slight movement of the piston independent of any movement of the slide valve and by means of an inclined plane on the piston stem, substantially as described.

3. In graduating valves for triple valve mechanisms, the combination of the piston chamber 9, and piston 10, working therein, the valve chamber 7 and valves 13 and 11 working therein, a port 2 leading from the chamber 7 to the brake cylinder passage 1, the valve 11 pivoted to the valve 13 and controlling said port in the application of the brakes, an exhaust port 4 leading to the atmosphere, said exhaust port being adapted to be put in communication with the brake cylinder port 2 by means of the cavity 3 in the face of the slide valve 13 to insure the release of the brakes; and the pivot pin 19 for holding the graduating valve in position, substantially as described.

4. In graduating valves for triple valve mechanisms the piston and its stem having inclines 12 and 17, a valve 11, for controlling a port opening from the auxiliary reservoir to the brake cylinder, and pivoted to and in combination with a main slide valve 13, and adapted to be operated to open and close the brake cylinder port by the inclines 12 and 17 all arranged substantially as shown.

JAMES T. HAYDEN.

Witnesses:
WILBUR G. GLOVER,
S. RICHARDSON.